United States Patent [19]
Rottler

[11] Patent Number: 5,349,900
[45] Date of Patent: Sep. 27, 1994

[54] DUAL-AXIS TABLE ASSEMBLY

[76] Inventor: Donald B. Rottler, 2617 W. Galer St., Seattle, Wash. 98199

[21] Appl. No.: 641

[22] Filed: Jan. 5, 1993

[51] Int. Cl.⁵ .................................................. A47F 5/12
[52] U.S. Cl. .......................................... 100/4; 108/8
[58] Field of Search ................. 108/1, 4, 6, 7, 8, 143, 108/20; 248/188.1, 188.2

[56] References Cited

U.S. PATENT DOCUMENTS

| | | | |
|---|---|---|---|
| 2,686,095 | 8/1954 | Causon | 108/4 |
| 3,288,421 | 11/1966 | Peterson | 108/4 X |
| 4,462,579 | 7/1984 | Satake | 108/20 X |
| 4,539,913 | 9/1985 | Marchant | 108/8 X |
| 4,607,578 | 8/1986 | Inoue et al. | 108/20 X |
| 4,988,261 | 1/1991 | Blatt | 108/143 X |
| 5,165,296 | 11/1992 | Yanagisawa | 108/143 X |

*Primary Examiner*—Jose V. Chen
*Attorney, Agent, or Firm*—Seed and Berry

[57] ABSTRACT

A dual-axis table assembly has left and right sector plates mounted on the underside of a table. Each sector plate is seated on a respective left and right pair of shoes which are mounted on a base. A left handwheel operates to turn the left sector for front/rear table tilting, and a right handwheel operates to change the distance between the right pair of shoes for right/left table tilting. A clamp mechanism grips the left sector wheel when the table is locked in adjusted position.

8 Claims, 5 Drawing Sheets

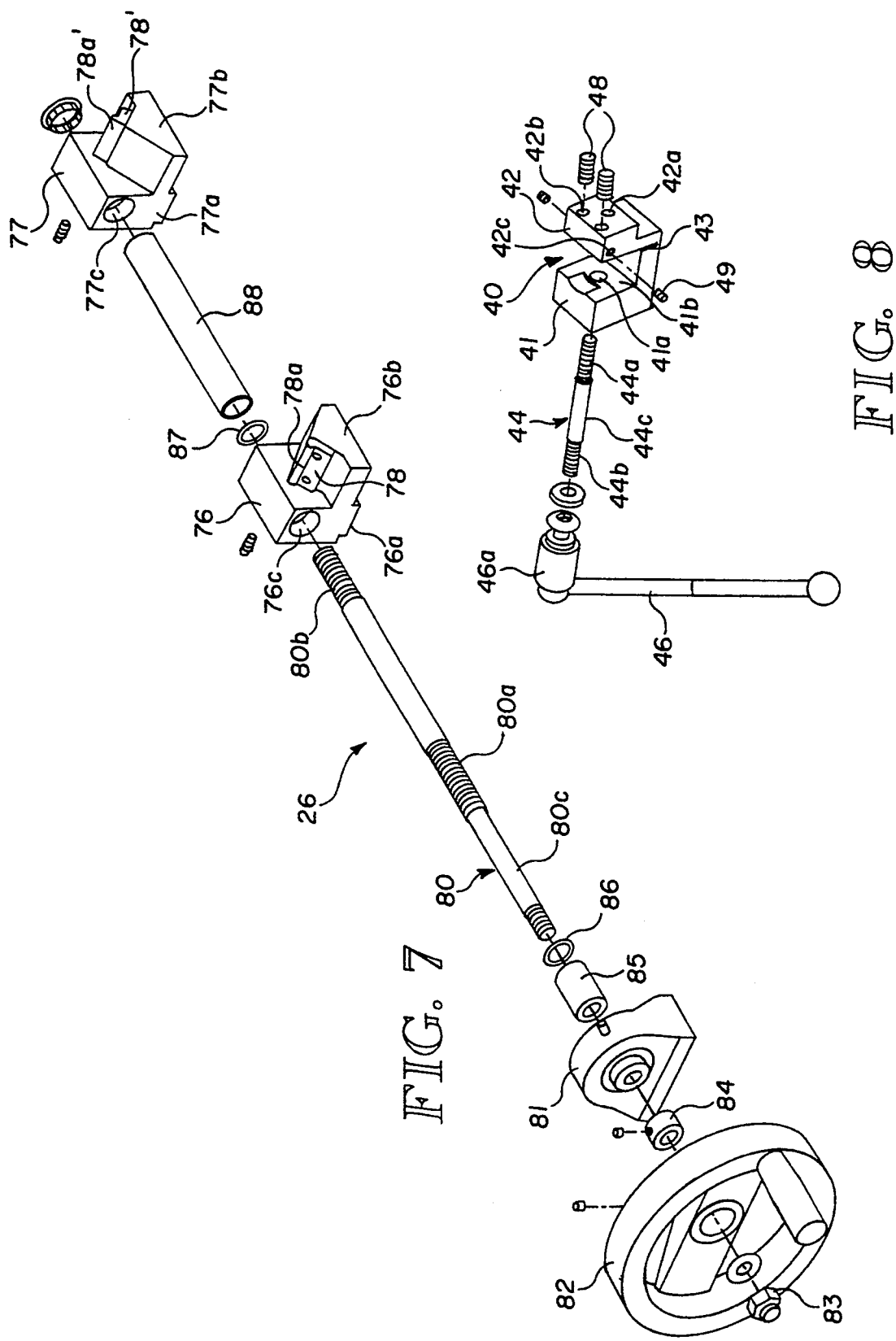

1

DUAL-AXIS TABLE ASSEMBLY

TECHNICAL FIELD

The present invention relates to adjustable dual-axis tables of the type commonly used to support work pieces being machined.

BACKGROUND OF THE INVENTION

Dual-axis tables are commonly mounted on machine tool beds to receive fixtures for positioning and restraining work pieces such, for example, as engine blocks to be resurfaced. The fixtures are normally anchored in position by bolts threaded into T-nuts mounted in T-ways extending along the table. In the past front/back tilting and right/left tilting of the dual-axis tables commonly in use has involved manual operation of two handwheels and also tightening of several clamps after the tilting adjustment has been achieved. The tilting mechanism is such that tilting of one axis so effects the position of the table with respect to the second axis that several manipulations of the handwheels is necessary to achieve the desired leveling of the workpiece on the table. Furthermore, the need to also operate several clamps is unduly time consuming and aggravating. Also, on occasions the operator forgets to release one or more of the clamps before commencing a readjustment of the table tilt, and ends up damaging the table mechanism by turning one of the handwheels too hard in an effort to make the desired adjustment.

Accordingly, the present invention aims to provide an improved dual-axis table operating system having only one clamping action and requiring less manipulation of the tilting mechanism.

SUMMARY OF THE INVENTION

The present invention utilizes a pair of axially spaced sector plates depending from the table and seated on respective pairs of shoes. One handwheel operates to turn one of the sector plates with respect to its center axis to thereby provide a front/back tilting adjustment. The other handwheel operates to vary the distance between the shoes beneath the second sector plate. This causes the second sector plate to raise or lower and thereby provides a right/left tilting adjustment. The sector plate used in the front/back adjustment extends between the jaws of a clamp operated by a handle at the corresponding end of the table.

BRIEF DESCRIPTION OF THE DRAWINGS

FIG. 7 is an exploded isometric view of the left/right tilt assembly; and

FIG. 8 is an exploded isometric view of the clamp assembly.

DETAILED DESCRIPTION OF THE INVENTION

Figure 1:
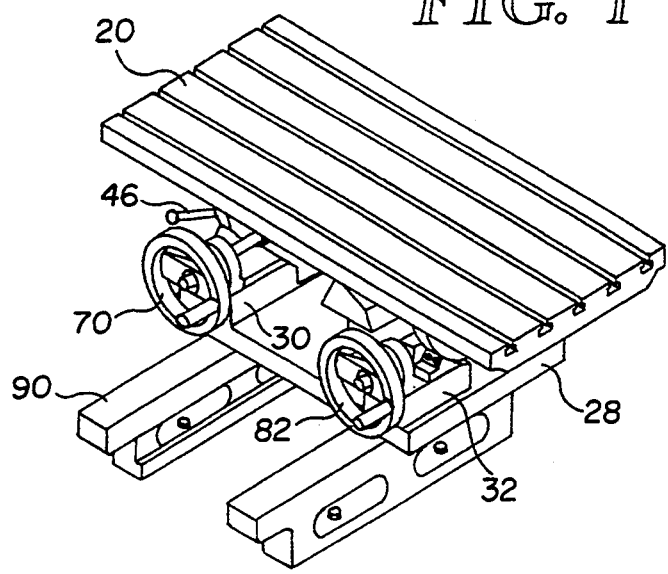
FIG. 1 is a perspective view of a dual-axis table assembly in accordance with the present invention, shown mounted on a pair of rails.
Figure 2:
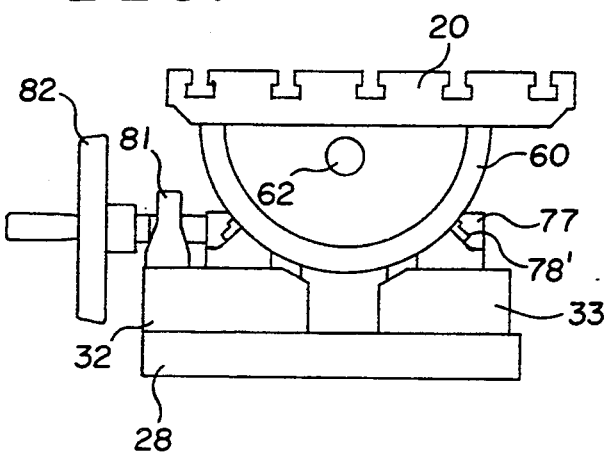
FIG. 2 is an elevational view showing the right end of the table assembly.

Referring to the drawings, it is seen that the dual-axis table assembly of the present invention has a table 20, base assembly 22, front/rear tilt assembly 24, and left/right tilt assembly 26.

The base assembly 22 has a rectangular base plate 28 with upstanding integral corner blocks 30–33 and a central block 34. The left blocks 30–31 have generally triangular upward extensions 30a–31a on which wiper shoes 36 are screw mounted to slope upwardly toward one another. These shoes have upper flanges with exposed upper flat contact faces 36a which are both generally tangential to a circle centered on a longitudinal elevated axis 38.

A generally U-shaped clamp 40 is mounted midway between the left corner blocks 30–31 to present two upstanding jaws 41–42. A slot 43 in the base of the clamp next to the right jaw 42 provides for movement of the right jaw toward the left jaw 41 which is stationary. The jaws have aligned holes 41a–42a to receive a clamp shaft 44 having a handle 46 mounted thereon, and having a spherical washer 47 sleeved thereon. The right hole 42a is threaded to receive a threaded portion 44a on the right end of the clamp shaft, and the opposite end portion 44b is threaded to receive the hub 46a of the handle 46. The central portion 44c of the clamp shaft is unthreaded to occupy the left jaw bore 41a and the space between the jaws 41–42.

Above the shaft receiving hole 42a the right jaw 42 has a pair of threaded parallel holes 42b receiving a pair of jaw screws 48 which preferably have brass faced heads on their left ends. These heads project slightly to the left from the inner face of the right jaw 42 so as to function as the clamping contact surface for the right jaw in opposition to the inner face 41b of the left jaw 41. The right jaw also has a pair of aligned threaded bores 42c for a pair of set screws 49 extending from the front and back sides to intersect the holes 42b. These set screws 49 are used to lock the setting of the jaw screws 48.

The two right blocks 32–33 on the base plate are formed with aligned upper keyways 32a–33a and the central block 34 has a bore 34a passing through the base plate 28 and sloping to the right in the upward direction. This bore 34a receives a hold-down bolt 50 which projects by its threaded end above the base plate 28 to receive washers 51–52 and a spring 53, and to screw through a jam nut 54 into a fork member 55 bridged by a pivot pin 56. At its head end beneath the base plate 28 the bolt 50 has sleeved thereon a set of Belleville washers 57 between a pair of washers 58, and a spherical washer 59.

Continuing to the front/rear tilt assembly 24, such includes right and left sector plates 60–61 having upper chord faces 60a–61a on which the table 20 is screw mounted. The arcuate face 61b of the left sector plate 61 is seated on the wiper faces 36a, and the arcuate face 60b of the right sector plate 60b is seated on complementing wiper faces provided by the left/right tilt assembly 26 to be later discussed. The arcuate faces 60b and 61b are preferably slightly rounded transversely. The sector plates 60–61 have aligned journals at their center of curvature receiving a non-rotation shaft 62 having the longitudinal axis 38 as its center axis. A collar 63 on the shaft 62 prevents endwise movement of the shaft to the left relative to the left sector plate 61. At its longitudinal center the shaft 62 has a hole 62a receiving the pivot pin 56 and is straddled by the forks of the fork member 55 mounted on the upper end of the hold-down bolt 50. Since this bolt 50 slopes downwardly to the left from its connection with the shaft 62, the shaft is axially biased to the left as well as downwardly when the bolt 50 is tightened in the fork member 55 such as to load the Belleville washers 56. Hence, the sector plates 60–61 are held down in working position by the loaded shaft 62, and the left sector plate 61 is biased against the left stationary jaw 41 of the clamp 40.

The left sector plate 61 has a hole 61c spaced beneath the shaft 62 and receiving a crank pin 64 projecting from a pivot nut 65 which has a flat bottom face adjacent the top of the right jaw 42 of the clamp 40 for clearance. The left end of the crank pin 64 projects beyond the sector plate 61 to receive a collar 66 fixed to the shaft by a set screw 67. A Belleville washer 63 is fitted on the crank pin 64 between the sector plate 61 and the opposing face of the pivot nut 65.

Threaded into the pivot nut 65 is the threaded rear end portion 68a of a front/rear tilt shaft 68. This shaft extends forwardly by a necked portion 68c through a pillow block 69 which is bolted to the base plate 28 and contains a spherical bearing. Collars 72–73 are mounted on the shaft 68 at the ends of the pillow block 69, and the shaft continues forwardly from the front collar 72 through a handwheel 70 to a lock nut 71 which is threaded out a threaded front end portion 68b of the shaft 68. Tubes 74–74a are sleeved on the shaft 68 to interfit with the housing of the pivot nut 65, and washers 75, including a front pair of Belleville washers, are positioned on the shaft between the collar 73 and the tube 74. Suitable seals are preferably provided in the front of the front tube 74 and in the rear of the back tube 74a.

Since the tilt shaft 68 cannot move endwise relative to the pillow block 69, and the pivot nut 65 cannot turn because of the crank pin 64, turning of the shaft 68 by turning the handwheel 70 results in movement of the nut 65 along the tilt shaft. This movement results in tilting of the shaft 68 in the pillow block 69 and turning of the left sector plate 61 on the shaft 62 and relative to the wiper shoes 36. Since the table 20 is mounted on the sector plates 60–61, turning of the left sector plate 61 by operation of the handwheel 70 results in tilting of the table and turning of the right sector plate 60 on the shaft 62.

The left/right tilt assembly 26 has two opposing slide blocks 76–77 which have bottom integral keys 76a–77a which ride in the keyways 32a–33a provided by the right corner blocks 32–33. At their right side the slide blocks 76–77 have extensions 76b–77b with generally triangular head portions on which respective wiper shoes 78–78' are mounted to slope upwardly like the wiper shoes 36–36'. These shoes 78–78' also have upper flanges with exposed upper flat contact faces 78a–78a' which are engaged by the arcuate rim face 60b of the right sector plate 60.

The slide blocks 76–77 have aligned bores 76c–77c which are threaded with opposite hands to receive a left/right tilt shaft 80 having threaded portions 80a–80b of opposite hand matching the threads of the bores 76c–77c, respectively. The tilt shaft 80 is necked at the forward end of the threaded portion 80a to permit the resulting necked portion 80c to pass forwardly through the bore 76c in the front slide block 76 during assembly. The necked portion 80c passes through a pillow block 81 which is mounted on the forward end portion of the right front block 32. Forwardly of the pillow block 81 the shaft 78 passes through a handwheel 82 secured to the shaft 80 by a front nut 83 threaded onto a front threaded portion 80d of the shaft. The shaft 80 may also be provided with a collar 84 behind the handwheel 82, a spacer 85 and bumper ring forward 86 behind the pillow block 81, and a bumper ring 87 and cover tube 88 between the slide blocks 76–77.

When it is desired to tilt the table 20 upwardly at the right, the handwheel 82 is turned to cause sliding movement of the slide blocks 76–77 toward one another, thereby raising the right sector plate 60. Likewise, when it is desired to tilt the table downwardly at the right, the handwheel 82 is turned in the opposite direction to cause the slide blocks 76–77 to move farther apart, thereby lowering the sector plate 60. When the table tilts left or right responsive to up or down movement of the right sector plate 60, both sector plates 60–61 and the shaft 62 therebetween also tilt accordingly.

After the table 20 has been adjusted as desired by operating the handwheels 70 and 82, the table setting is locked by turning the handle 46 to firmly clamp the left sector plate 61 between the jaws 41–42 of the clamp unit 40. This single clamping prevents front/back and right-/left tilting movement of the table 20.

Figure 3:
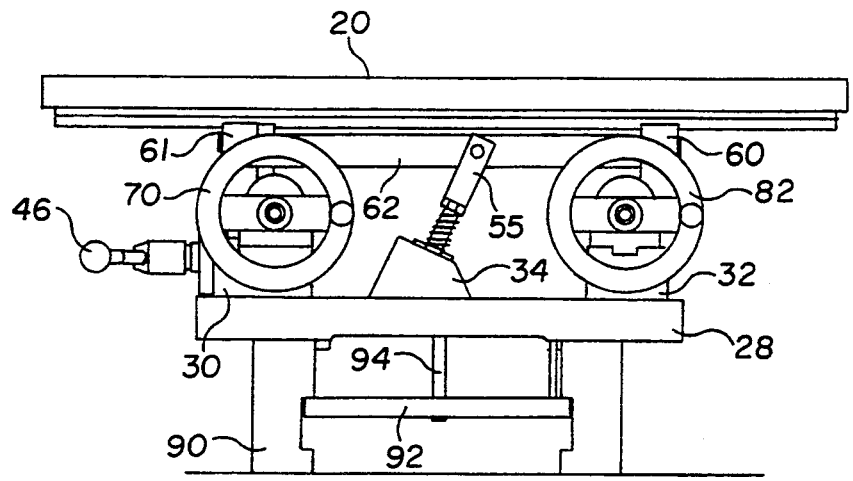
FIG. 3 is a front elevational view of the table assembly mounted as in FIG. 1.
Figure 4:
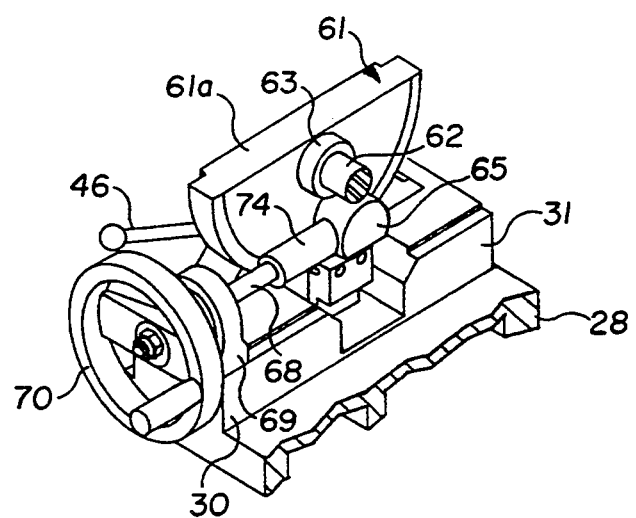
FIG. 4 is a transverse vertical sectional view of the table assembly taken as indicated by the line 4—4 in FIG. 1 and with the table top removed.
Figure 5:
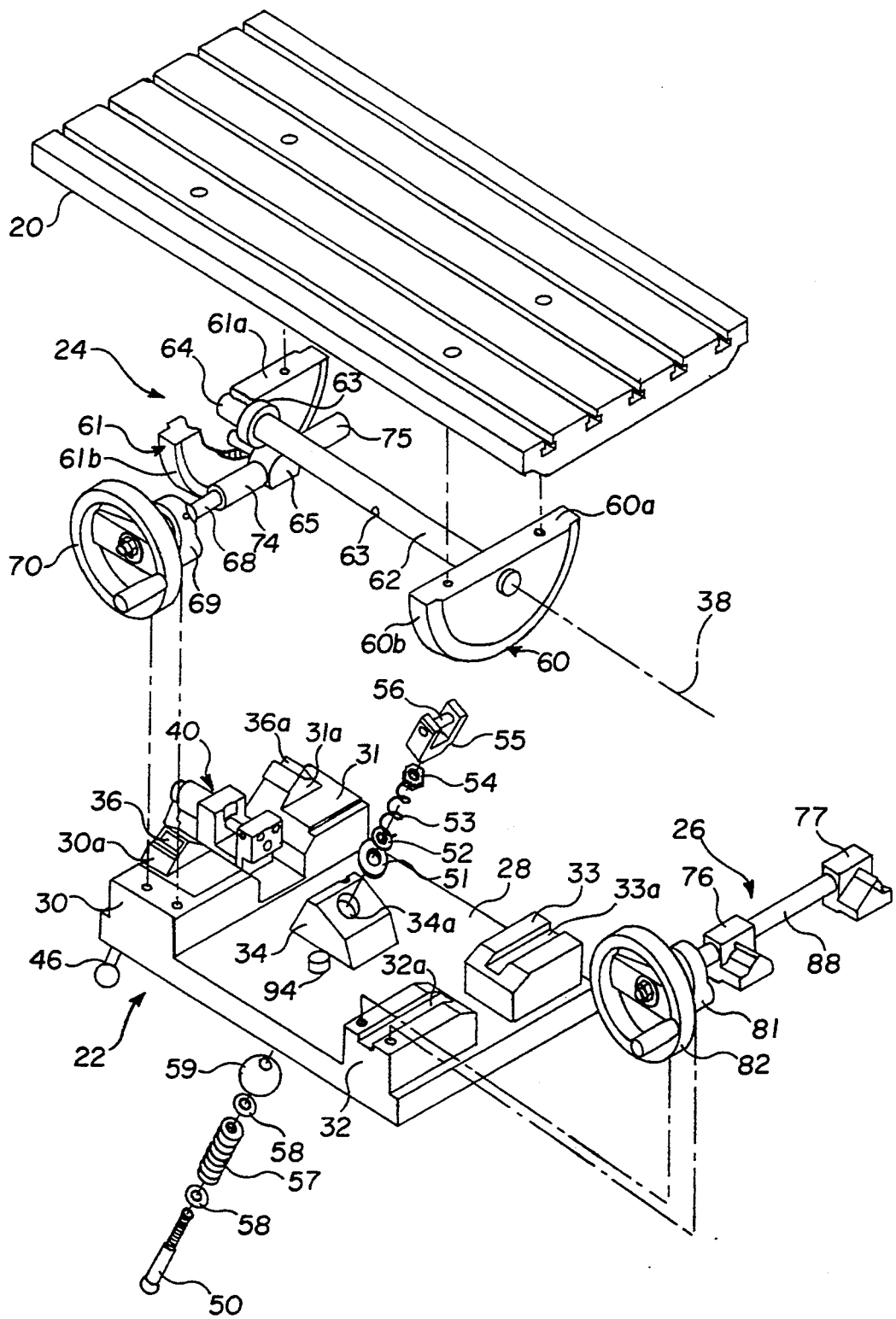
FIG. 5 is an exploded isometric view of the dual-axis table assembly.
Figure 6:
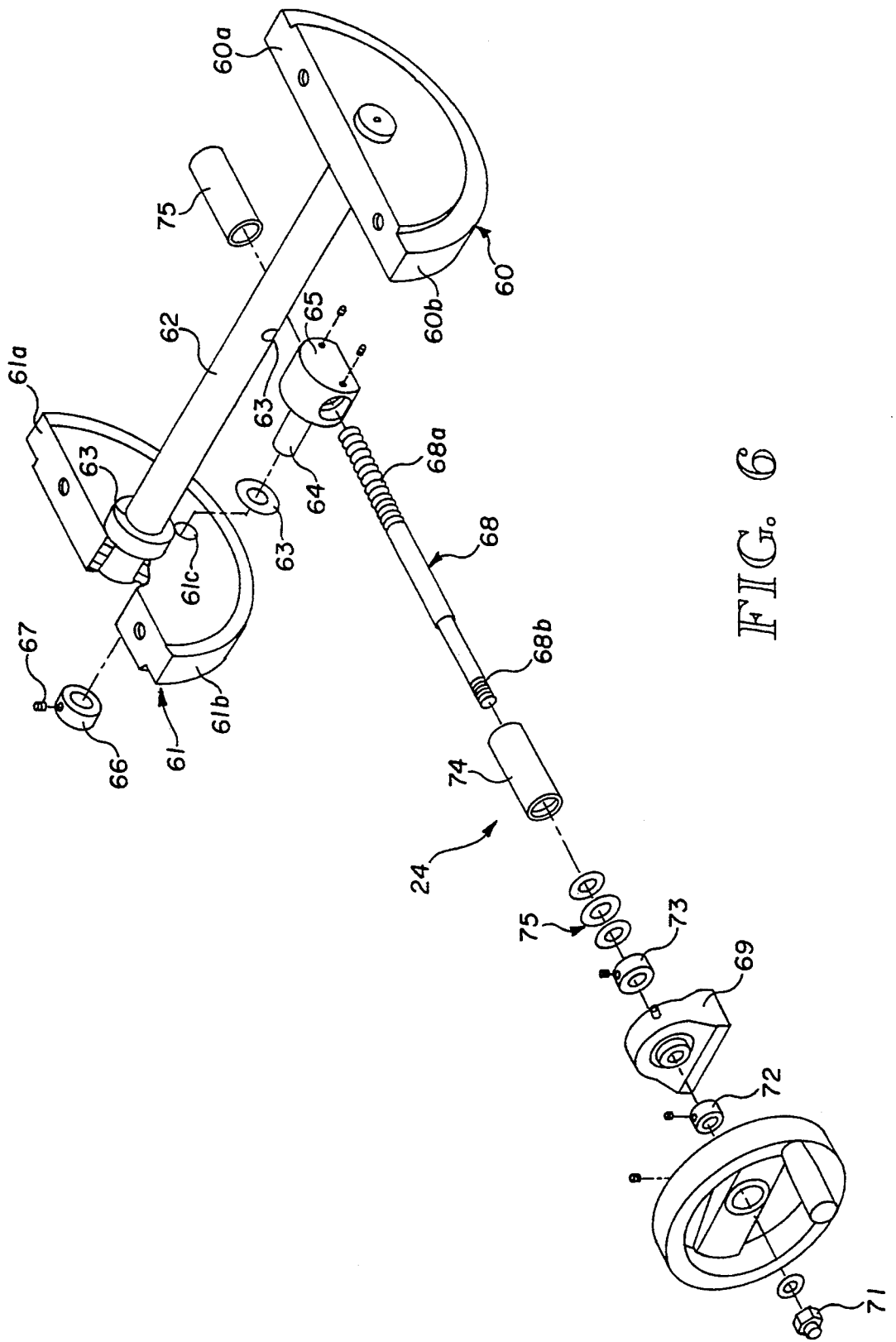
FIG. 6 is an exploded isometric view of the front/rear adjustment assembly.

As indicated in FIGS. 1 and 3, the base 28 of the dual-axis table assembly may be mounted on a pair of rails 90 which are in turn bolted to a machine tool bed. An adjustable cross-bar 92 bridges the rails and seats on its upper side against respective shoulders extending along the opposed inside faces of the rails in response to tightening of a hold-down bolt 94 extending through the cross-bar 92 and base 28 from a postion adjacent the front of the central block 34 (see FIG. 5). This arrangement permits the dual-axis table to be adjusted forwardly and rearwardly relative to the machine tool bed by being moved along the rails 90. Such movement can be eased by providing the base 28 with an air lift.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A dual-axis table assembly comprising:
   a table having a front and back, and left and right ends,
   a base spaced beneath said table;
   left and right sector members each having a center of curvature, said members depending rigidly from said table and spaced apart in parallel relation perpendicular to a left to right axis passing through each of their centers of curvature;
   left and right pairs of support elements on said base supporting said left and right sector members, respectively, said left pair of elements supporting said left sector member at left support locations spaced apart in a front to back direction relative to said table, and said right pair of elements supporting said right sector member at right support locations spaced apart in a front to back direction relative to said table;

left adjustment means carried by said base for turning said left sector member on said left pair of support elements with respect to said axis and thereby tilting said table and right sector member in a front-/back direction relative to said base; and right adjustment means carried by said base for adjusting the distance between said right pair of elements to vary the distance between said right support locations to thereby selectively raise or lower said right sector member and responsively tilt said axis, table, and both sector members in a right/left direction relative to said base.

2. A dual-axis table assembly according to claim 1 in which a clamp is mounted on said base and has left and right jaws on the left and right sides respectively, of said left sector member;

and means for selectively clamping said jaws against said left sector member to prevent adjustment of the table.

3. A dual-axis table assembly according to claim 2 in which a shaft extends through said sector members along said axis; and hold-down means extends between said base and said shaft.

4. A dual-axis table assembly according to claim 1 in which said left adjusting means comprises a crank pin connected to said left sector member in offset relation to said axis;

a nut connected to said crank pin;

a left shaft threaded in said nut and having a handle;

means on said base for preventing endwise movement of said left shaft so that turning of said handle results in movement of said nut along said left shaft and responsive turning of said left sector member about said axis to thereby give a front/back tilt to said table.

5. A dual-axis table assembly according to claim 4 in which said left shaft extends through a spherical bearing mounted on said base whereby said left shaft is free to tilt while being turned.

6. A dual-axis table according to claim 1 in which said right adjustment means comprises:

front and back blocks fixed on said base and presenting upper front and back aligned keyways;

front and back slide blocks interfitting with said keyways, said slide blocks having said right pair of elements thereon;

front to back threaded bores extending in aligned relation through said slide blocks, the threads in said bores being of opposite hand;

and a right adjustment shaft having front and back matching threaded portions meshing with the threads in said front and back slide blocks, respectively, whereby turning of said right adjustment shaft moves said slide blocks toward or away from one another.

7. A dual-axis table assembly comprising:

a table have a front and back, and left and right ends;

left and right sector members each having a center of curvature, said members depending rigidly from said table and spaced apart in parallel relation perpendicular to a left to right axis passing through each of their centers of curvature;

left and right pairs of contact elements carried by a base and supporting said left and right sector members, respectively, said left pair of elements supporting said left sector member at left support locations spaced apart in a front to back direction relative to said table, and said right pair of elements supporting said right sector member at right support locations spaced apart in a front to back direction relative to said table;

a crank pin connected to said left sector member;

left adjusting means carried by said base and connected to said crank pin for selectively moving it forwardly or rearwardly for front/back tilting of said table relative to said base;

front and back slide blocks on said base carrying said right pair of contact elements;

and right adjustment means carried by said base for sliding said slide blocks toward or away from one another to vary the distance between said right support locations and thereby selectively raise or lower said right sector member for left/right tilting of said table relative to said base;

a clamp on said base arranged to engage said left sector member;

means for selectively engaging and disengaging said clamp;

a longitudinal shaft on said axis extending between said sector members;

and hold-down means extending between said base and longitudinal shaft and biasing the latter downwardly and to the left.

8. A dual axis table assembly comprising, a table having front and back sides, and right and left ends;

right and left sector plates depending from rigid connections with said table, said sector plates having arcuate rim faces and having their center of curvature on a common longitudinal axis parallel to said table;

a base spaced beneath said table;

right and left pairs of spaced apart shoes mounted on said base said right pair of shoes being spaced apart in a front to back direction relative to said table, and said left pair of shoes being spaced apart in a front to back direction relative to said table;

said right sector plate having its rim face engaging said right pair of shoes and right spaced apart support locations, and said left sector plate having its rim face engaging said left pair of shoes at left spaced apart support locations;

first adjustment means carried by said base for adjusting the distance between the shoes in said right pair to vary the distance between said right support locations and thereby selectively raise and lower said right sector plate and thereby tilt said table left or right relative to said base;

second adjustment means carried by said base for turning said sector plates together with respect to said longitudinal axis to selectively tilt said table to the back or front relative to said base;

and clamping means for selectively locking said left sector plate to said base against endwise motion or turning movement.

* * * * *